United States Patent [19]

Sato et al.

[11] Patent Number: 4,679,913
[45] Date of Patent: Jul. 14, 1987

[54] VARI-FOCAL OBJECTIVE LENS OF SHORT TOTAL LENGTH

[75] Inventors: Yasuhisa Sato, Kanagawa; Yasuyuki Yamada, Tokyo; Hiroki Nakayama; Kouji Oizumu, both of Kanagawa, all of Japan

[73] Assignee: Canon Kabushiki Kaisha, Japan

[21] Appl. No.: 750,698

[22] Filed: Jun. 28, 1985

[30] Foreign Application Priority Data

Jul. 2, 1984 [JP] Japan ................................ 59-137019

[51] Int. Cl.4 ...................... G02B 15/00; G02B 13/18
[52] U.S. Cl. ..................................... 350/423; 350/432
[58] Field of Search ............... 350/423, 426, 427, 464, 350/454, 455, 432

[56] References Cited

U.S. PATENT DOCUMENTS

4,400,064  8/1983  Ikemori et al. ...................... 350/432
4,469,412  9/1984  Tajima et al. ....................... 350/432

Primary Examiner—John K. Corbin
Assistant Examiner—P. M. Dzierzynski
Attorney, Agent, or Firm—Toren, McGeady & Associates

[57] ABSTRACT

An objective lens comprising a front lens unit and a rear lens unit with the separation between the two lens units being varied to vary the focal length of the entire system, wherein the front lens unit has a positive refractive power and consists of a positive lens of strong convex curvature toward the front, a negative doublet lens of a negative lens and a positive lens cemented together in this order from the front, and a positive lens sub-unit, and the rear lens unit has a negative refractive power and comprises a positive lens and a negative lens. Particularly the double lens is so designed that the comatic aberration in the intermediate zone of the image frame is stabilized throughout the entire range of variation of the focal length, and the halo in the intermediate zone in the telephoto end is well corrected.

10 Claims, 13 Drawing Figures

VARI-FOCAL OBJECTIVE LENS OF SHORT TOTAL LENGTH

BACKGROUND OF THE INVENTION

1. Field of the Invention:

This invention relates to compact zoom lenses, and more particularly to compact zoom lenses of short total length (the distance from the front vertex to the image plane) suited to lens-shutter cameras, video cameras or the like.

2. Description of the Prior Art:

The recent trend of reducing the size of lens shutter cameras, video cameras, or the like demands for compact zoom lenses of short total length. Particularly in the field of small size cameras whose objective lenses are not interchangeable, too, it is desired to use zoom lenses. For this purpose, the total length of the zoom lens has to be reduced to the same level as the fixed focal length lens that has so far been used has.

Many zoom lenses whose range includes the standard image angle for the ordinary lens-shutter cameras (the total angle of field $2\omega = 47°$ with a focal length of about 50mm for 35mm still cameras) have been proposed in, for example, Japanese Patent Publication No. SHO 49-29146. The zoom lens of this kind is constructed by two lens units of which the front is of negative power and rear is of positive power, and its focal length is varied by varying the separation between the two lens units. However, because its refractive power arrangement is negative-positive in this order from the front, the back focal distance is relatively long. This tends to make too long the total length of the lens when it applies to the lens-shutter camera, though it is suited to the single lens reflex camera.

Further in Japanese Laid-Open patent application No. SHO 56-128911 (corresponding to U.S. patent application Ser. No. 243,209 field Mar. 12, 1981 assigned to the assignee of this invention) and Japanese Laid-Open patent application No. SHO 57-201213 there have been proposed compact zoom lenses each comprising a front lens unit of positive power and a rear lens unit of negative power with the separation therebetween being varied to vary the focal length of the entire system. The use of such positive-negative power arrangement leads not only to relatively shorten the back focal distance but also to achieve a zoom lens of short total length.

SUMMARY OF THE INVENTION

A first object of the present invention is to provide a vari-focal objective lens in which the distance from the front lens surface to the image plane is short.

A second object is to increase the zoom ratio while preserving the entire system.

A third object is to correct coma in the intermediate zone of the image frame throughout the entire range of variation of the focal length, and correct halo in the intermediate zone in the telephoto end.

A fourth object is to correct image aberrations that are liable to deteriorate with zooming.

And, in the present invention, by specifying the form of each lens of the front and rear lens units, the amount of aberrations produced in each lens unit is lessened so that variation of aberrations with zooming is lessened. Particularly a second lens of the front lens unit is constructed in the form of a 2-1st lens of negative power and a 2-2nd lens of positive power cemented together, thereby good correction of coma in the intermediate zone of the image frame is maintained stable throughout the entire range of variation of the focal length, and halo in the intermediate zone in the telephoto end is well corrected.

Also, first and second lenses of the rear lens unit are both formed to meniscus shapes of rearward convexity, thereby variation with zooming of image aberrations is improved.

DETAILED DESCRIPTION OF THE PREFERRED EMBODIMENTS

Figure 1:
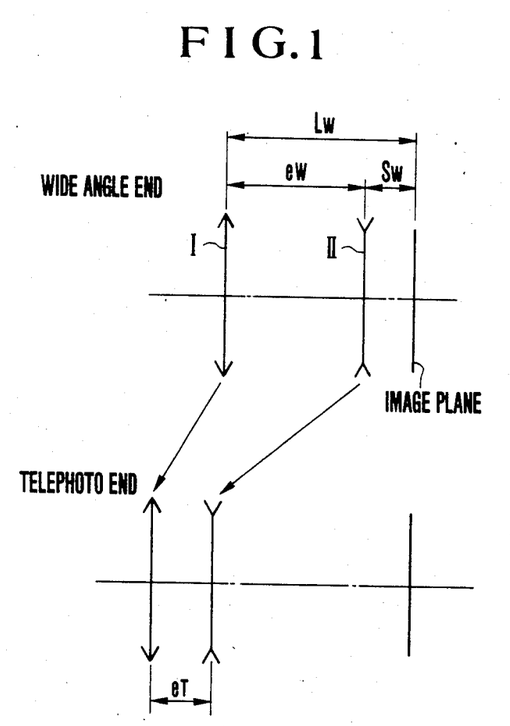
FIG. 1 is a schematic view of the optical arrangement of a zoom lens according to the present invention.

In the optical arrangement shown in FIG. 1, when to vary the focal length from the wide angle end to the telephoto end, a front lens unit I and a rear lens unit II are moved forward independently of each other while varying the separation between these two lens units.

The total length of such a zoom lens takes a minimum value at the wide angle end and a maximum value at the telephoto end. Upon consideration of the easiness of carrying the camera around, it is advantageous to reduce the total length of the lens in the wide angle end.

Now letting LW denote the total length of the lens in the wide angle end, SW the back focal distance, eW and eT the intervals between the principal points of the first and second lens units I and II in the wide angle and telephoto ends respectively, $\phi W$ and $\phi T$ the refractive powers of the entire system in the wide angle and telephoto ends respectively, and $\phi 1$ and $\phi 2$ the refractive powers of the front and rear lens units I and II respectively, we have $$LW = eW + SW$$

$$SW = \frac{1 - eW \cdot \phi 1}{\phi W}$$

From these, the total length of the lens LW becomes $$LW = eW + \frac{1 - eW \cdot \phi 1}{\phi W} \quad (A)$$

$$= \frac{1}{\phi W} + \left(1 - \frac{\phi 1}{\phi W}\right) \cdot eW$$

Now assuming that the refractive power of the wide angle end $\phi W$ has a constant value, then, from equation (A), the larger the refractive power $\phi 1$ and the smaller the principal point interval eW, the shorter the total length of the lens becomes.

Meanwhile, the refractive powers $\phi W$ and $\phi T$ of the entire system in the wide angle and telephoto ends may be expressed as:

$$\phi W = \phi 1 + \phi 2 - eW \cdot \phi 1 \cdot \phi 2 \quad (B)$$

$$\phi T = \phi 1 + \phi 2 - eT \cdot \phi 1 \cdot \phi 2 \quad (C)$$

Here the refractive powers $\phi W$ and $\phi T$ have given values, and the value of the principal point interval eT must be made as small as possible provided that the front and rear lens units do not interfere with each other when in the telephoto end, as is advantageous to minimize the bulk and size of the zoom lens, and, therefore, takes a certain value.

Therefore, the formulae (B) and (C) represent a relationship of the refractive powers $\phi 1$ and $\phi 2$ and the principal point interval eW. For a given value of any one of these variables, simultaneous equations with two unknowns are then obtained. Thus, a refractive power distribution over the zoom lens can be determined.

By taking the refractive power $\phi 1$ of the front lens unit I at a larger value with a corresponding smaller value of the interval between the principal points of the front and rear lens units I and II in the wide angle end, eW, the total length of the lens, LW, can be shortened. However, when the refractive power, $\phi 1$, is made too large, the refractive power, $\phi 2$, of the rear lens unit II, too, becomes large. This results in an increase of the Petzval sum in the negative sense with over-correction of the field curvature, depriving the image surface of flatness. Moreover, the comatic aberration in the intermediate zone of the image frame is increased and becomes difficult to correct for high grade imaging performance. Also when the principal point interval eW is made too small, the refractive powers $\phi 1$ and $\phi 2$ must be both largely increased in the positive and negative senses respectively to obtain the prescribed zoom ratio. Therefore, similar phenomena to the above are caused to take place. This is objectionable.

So, in order to achieve good stability of aberration correction throughout the entire range of variation of the focal length, it is preferred that within the framework of the above-described general lens configuration, the following various conditions are satisfied. That is, the values of the refractive powers $\phi 1$ and $\phi 2$ of the front and rear lens units I and II and the principal point interval eW fall within the following respective ranges:

$$\phi W < \phi 1 < 1.5 \phi W \quad (a)$$

$$-1.5 \phi W < \phi 2 < -0.5 \phi W \quad (b)$$

$$0.4/\phi W < eW < 1.0/\phi W \quad (c)$$

The technical significance of each of the conditions will next be explained.

Either when the refractive power $\phi 1$ of the front lens unit I exceeds the upper limit of inequalities of condition (a), or when the refractive power $\phi 2$ of the rear lens unit II exceeds the lower limit of inequalities of condition (b), though the total length of the lens becomes shorter, as has been described above, over-correction of field curvature results, and large coma is produced in the intermediate zone of the image frame. These aberrations are difficult to correct well. Conversely when the refractive power $\phi 1$ exceeds the lower limit of inequalities of condition (a) or when the refractive power $\phi 2$ exceeds the upper limit of inequalities of condition (b), the total length of the lens becomes longer, and the rear lens unit II will interfere with the image plane, so that it is difficult to use it as the photographic lens.

When the interval between the principal points of the front and rear lens units I and II in the wide angle end, eW, exceeds the upper limit of inequalities of condition (c), the rear lens unit II comes to interfere with the image plane so that similarly to the above, it is difficult to use it as the photographic lens. When the lower limit is exceeded, the refractive powers $\phi 1$ and $\phi 2$ of the front and rear lens units I and II must be increased in the positive and negative senses respectively to obtain the prescribed zoom ratio. This results in over-correction of field curvature, and coma is increased in the intermediate zone of the image frame. These aberrations become difficult to correct well.

Figure 2:
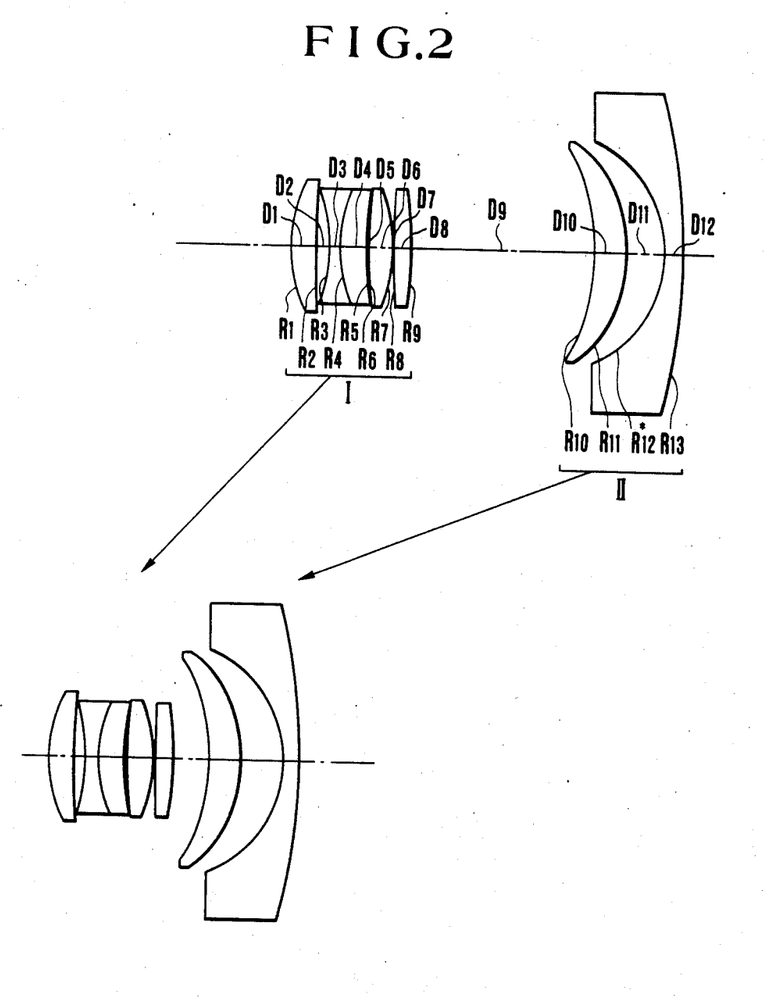
FIG. 2 is a block diagram of an example 1 of the lens.
Figure 3:
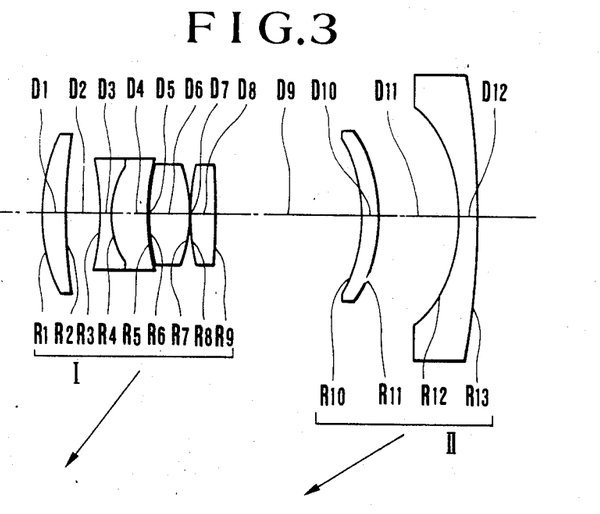
FIG. 3 is block diagram of another example 2 of the lens.
Figure 4:
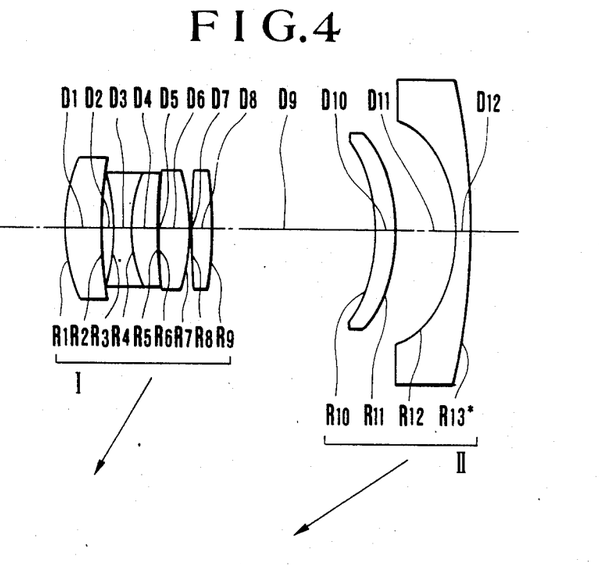
FIG. 4 is a block diagram of another example 3 of the lens.
Figure 5A:
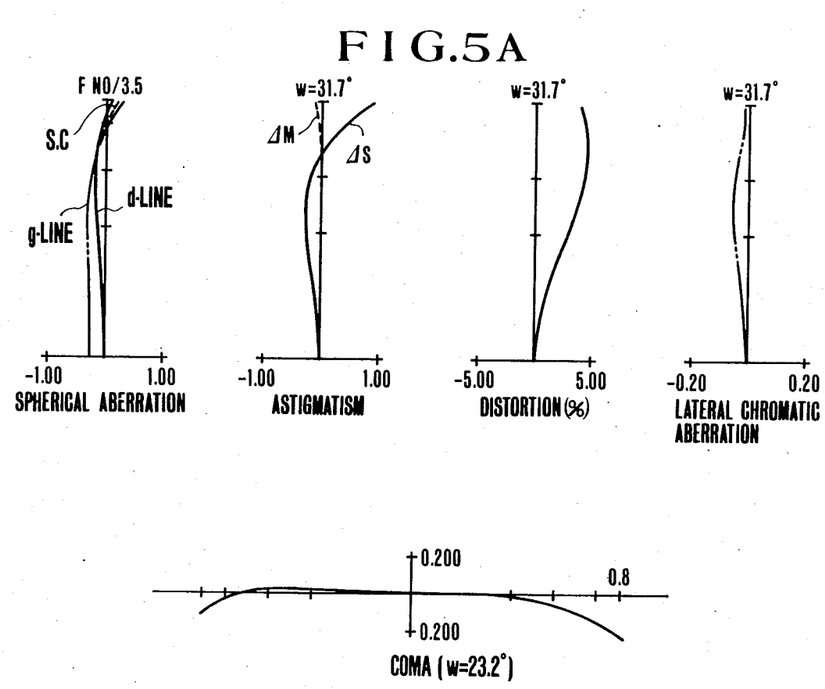
FIGS. 5A–5C are aberration curves of example 1.
Figure 5B:
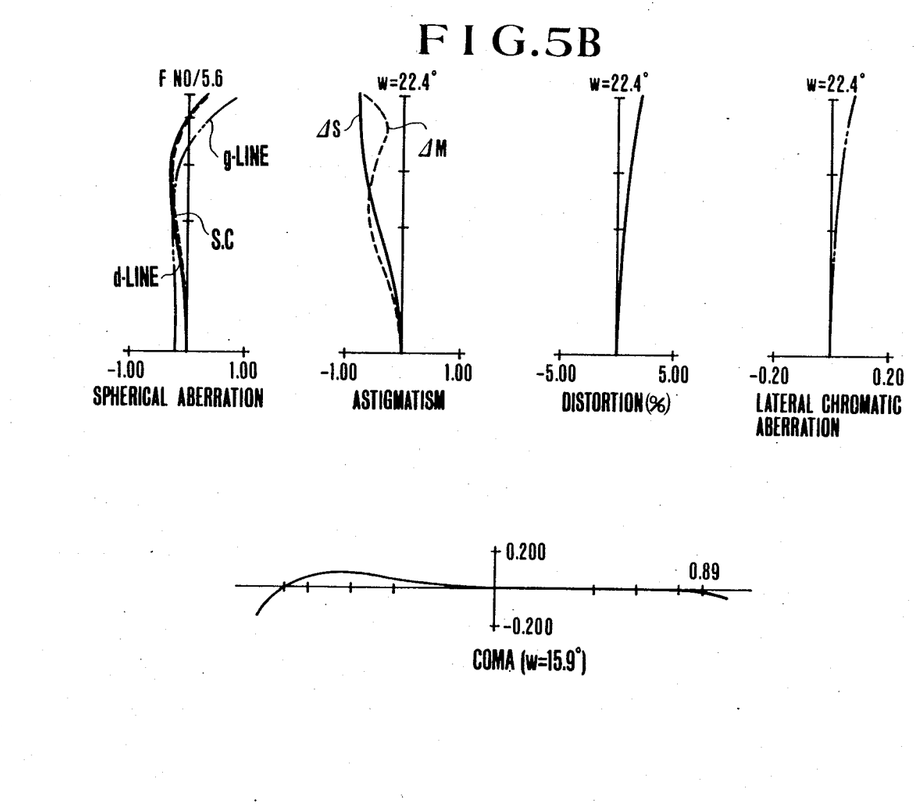
Figure 5C:
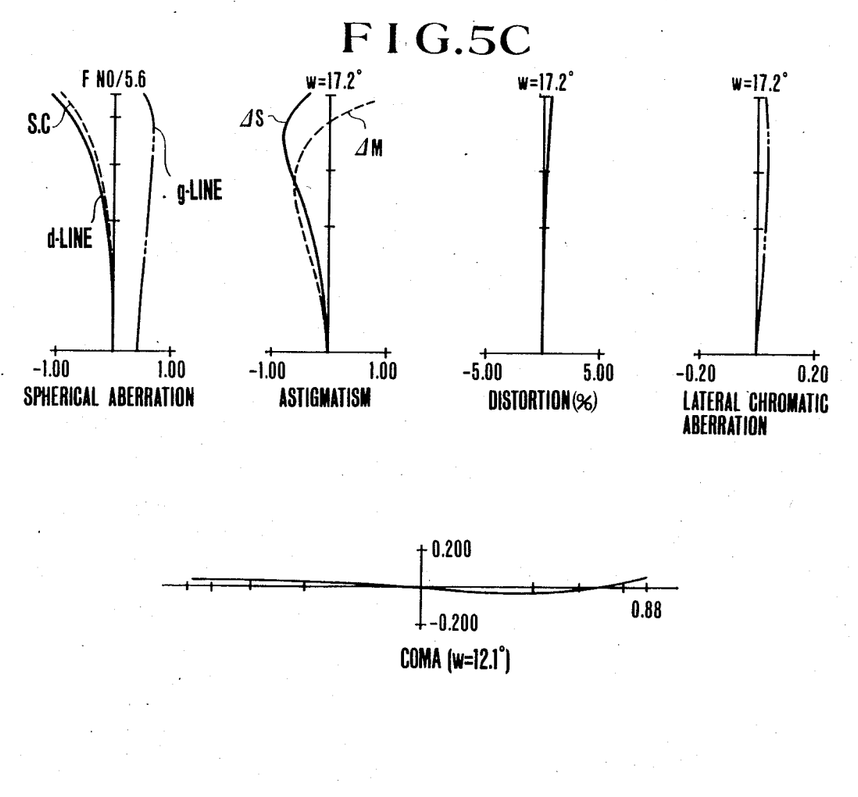
Figure 6A:
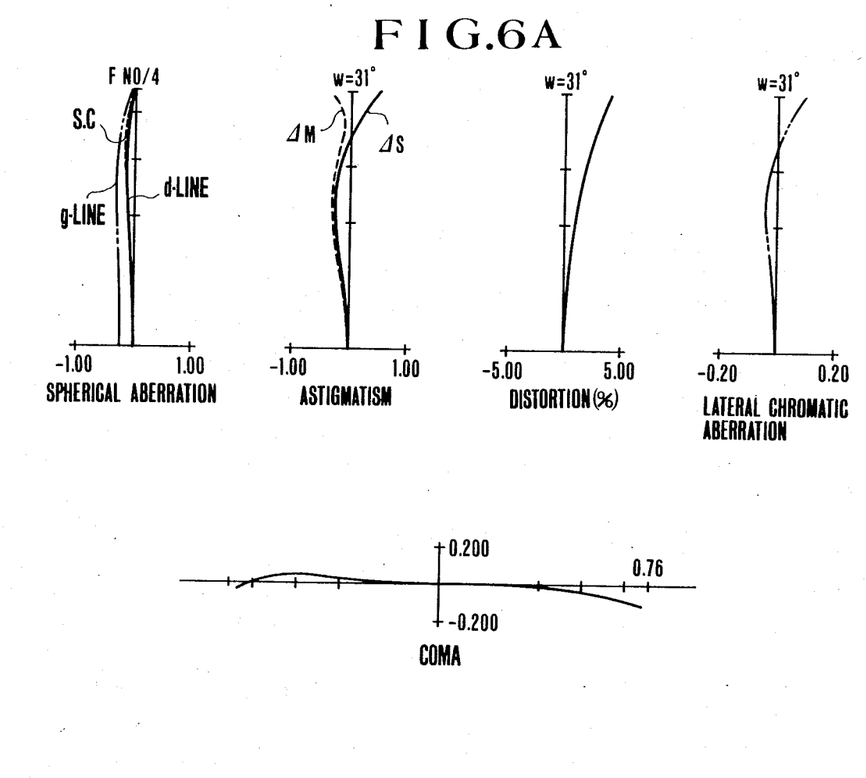
FIGS. 6A–6C are aberration curves of example 2.
Figure 6B:
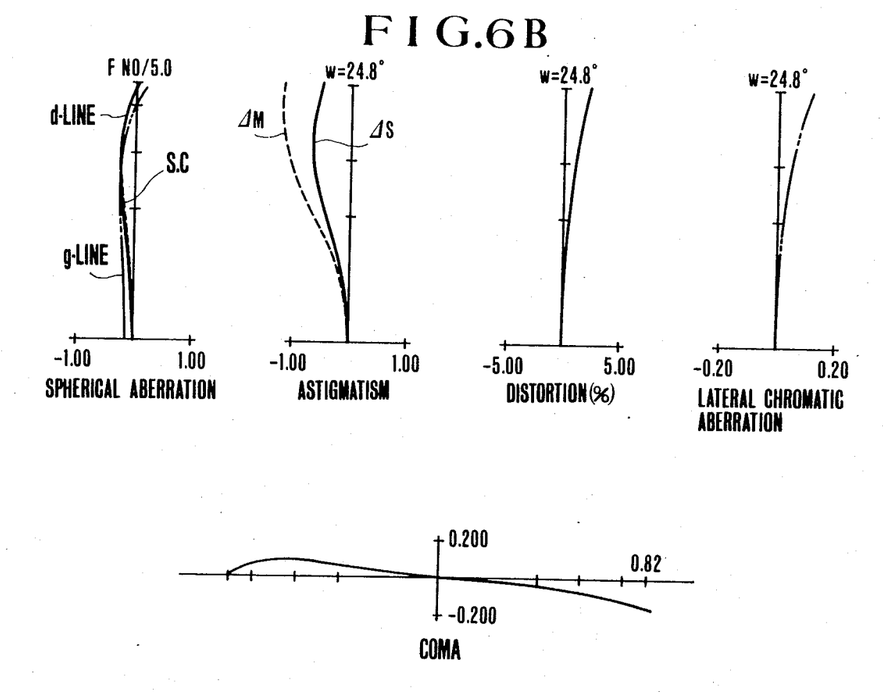
Figure 6C:
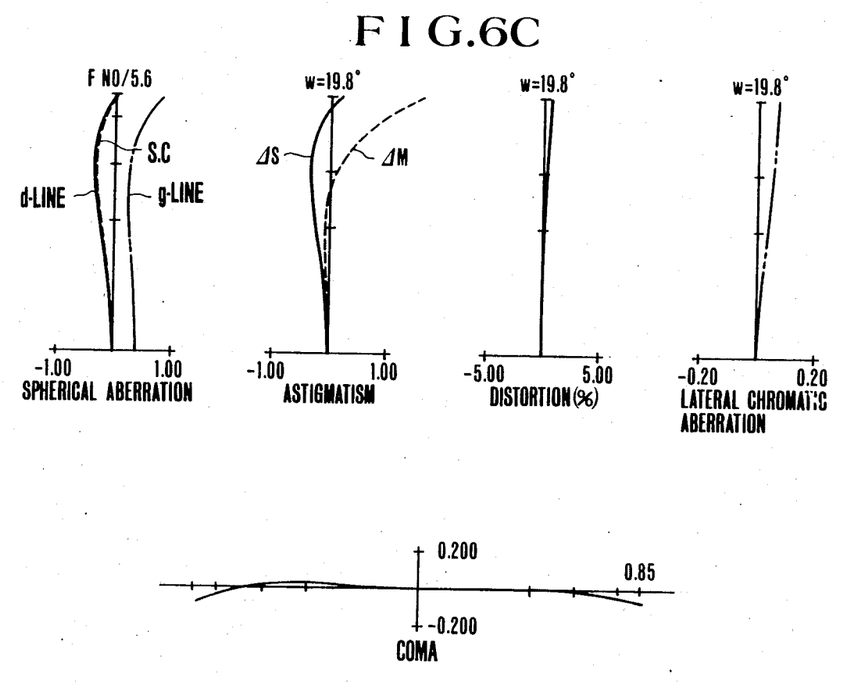
Figure 7A:
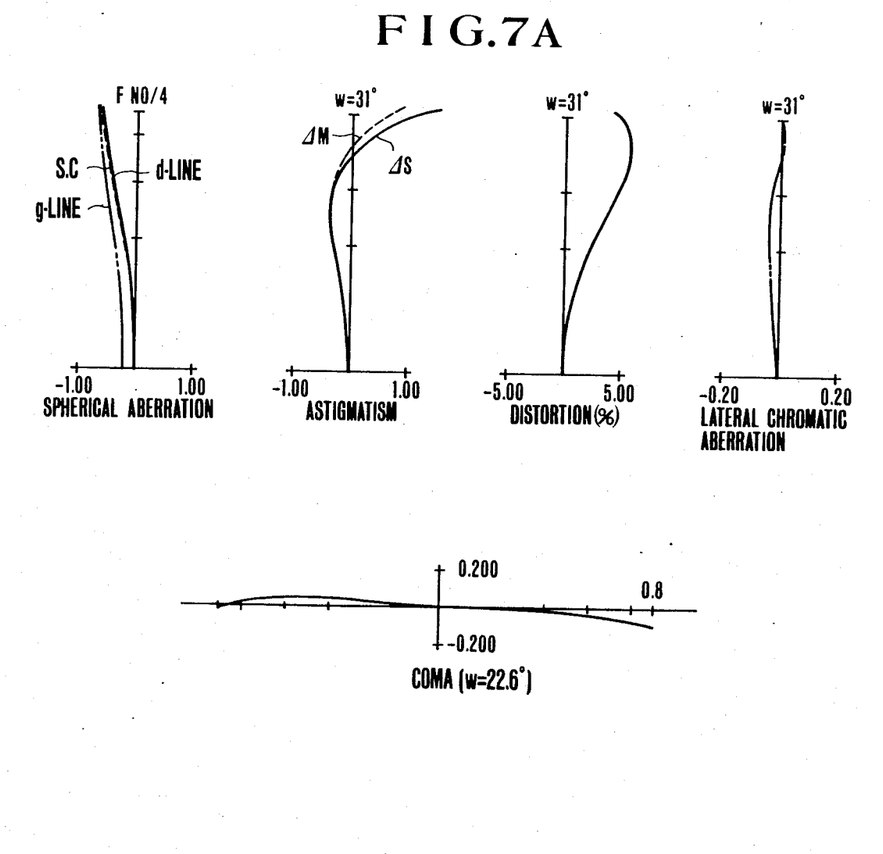
FIGS. 7A–7C are aberration curves of example 3.
Figure 7B:
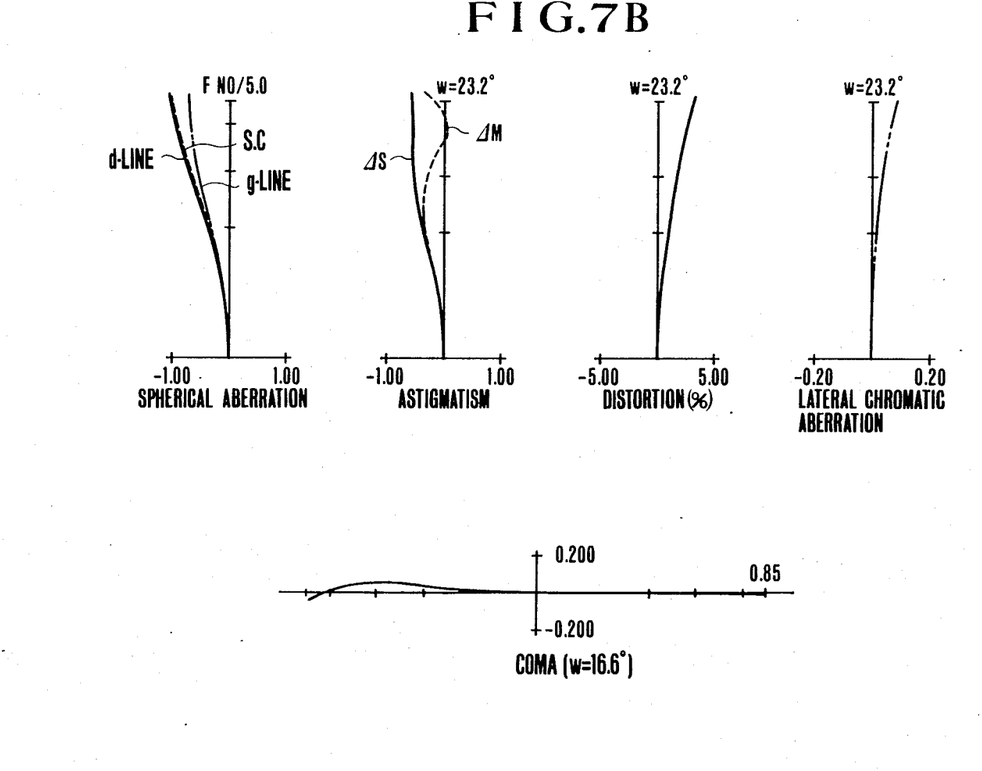
Figure 7C:
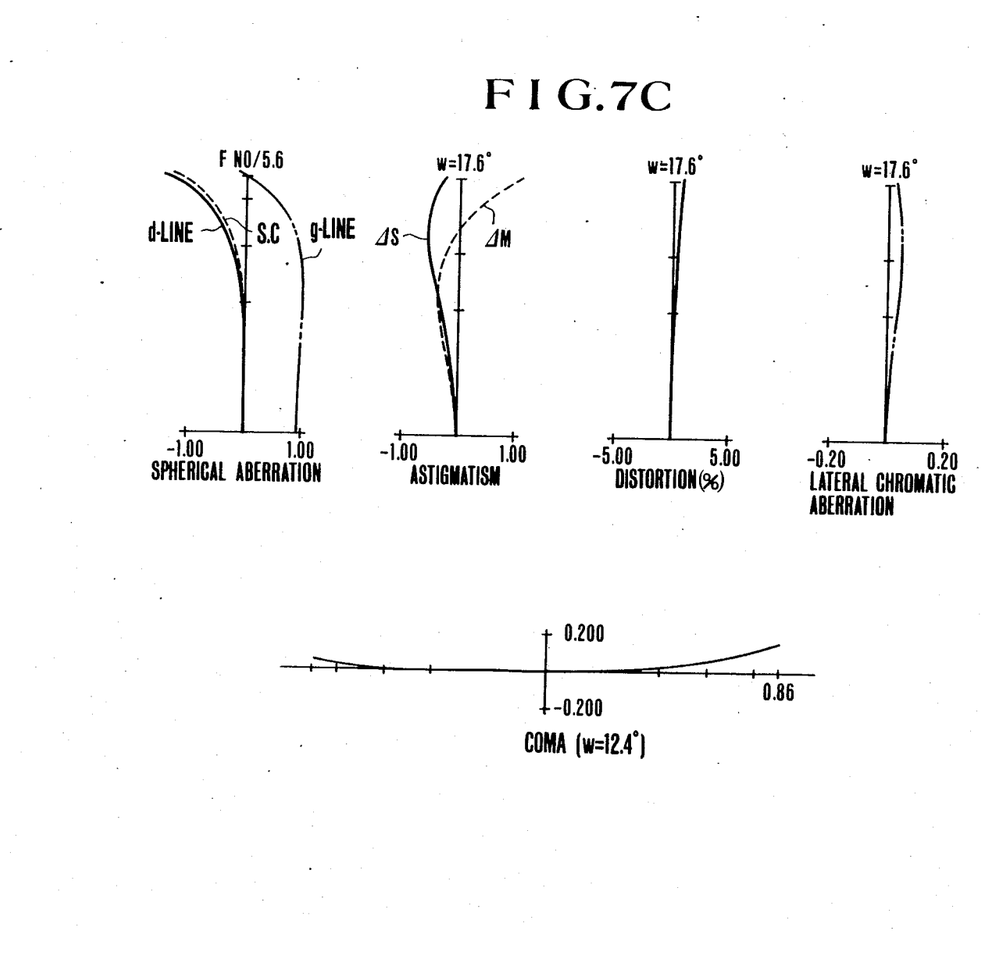

The concrete lens figurings that have taken into account all the above-stated conditions are shown in FIGS. 2, 3 and 4.

Each of the zoom lenses depicted in the figures is constructed with two lens units of which the front lens unit I is of positive refractive power, and the rear lens unit II is of negative refractive power, these lens units being axially moved in differential relation to effect zooming, wherein the front lens unit I is made to comprise, from front to rear, a meniscus-shaped first lens of positive refractive power convex toward the front, a second lens of a 2-first element of negative refractive power and a 2-second element of positive refractive power cemented together, whose overall power is negative, and third and fourth lenses of positive refractive powers, and the rear lens unit II is made to comprise a meniscus-shaped fifth lens of positive power convex toward the rear, and a meniscus-shaped sixth lens of negative power convex toward the rear.

To achieve good stability of, in particular, chromatic aberrations throughout the entire zooming range so that all the aberrations are corrected in good balance, it is preferred to satisfy the following conditions:

$$-0.6 \phi W < (N22 - N21/R4) < -0.1 \phi W \quad (1)$$

$$-10 < \nu 22 - \nu 21 < 10 \quad (2)$$

where N21 and $\nu 21$ are the refractive index and Abbe number of the glass of the 2-first lens element, N22 and $\nu 22$ are the refractive index and Abbe number of the glass of the 2-second lens element and R4 is the radius of curvature of the cemented lens surface of the second lens.

Inequalities of condition (1) are to stabilize coma in the intermediate zone of the image frame throughout the entire zooming range and correct well halo in the intermediate zone when in the telephoto end. Particularly when the refractive power of the cemented lens surface is made negative, positive spherical aberration and upward coma are produced. However, by making negative the refractive power of the rearmost lens surface of the second lens, as this surface bears part of the negative refractive power, the amounts of positive spherical aberration and upward coma produced are reduced from those when the cemented surface is not used.

When the upper limit of inequalities of condition (1) is exceeded, the negative refractive power of the cemented lens surface becomes too large, causing production of downward coma throughout the entire zooming range. When the lower limit is exceeded, the negative refractive power of the cemented lens surface becomes too small, causing production of upward coma throughout the entire zooming range, and causing the halo to increase in the telephoto end with decrease in the grade of imaging performance.

Inequalities of condition (2) are to correct longitudinal and lateral chromatic aberrations in good balance. When the upper limit is exceeded, over-correction of longitudinal chromatic aberration and under-correction of lateral chromatic aberration result over the entire zooming range.

When the lower limit of inequalities of condition (2) is exceeded, under-correction of longitudinal chromatic aberration and over-correction of lateral chromatic aberration result over the entire zooming range, each of which causes the imaging performance to lower objectionably.

In the present invention, to obtain an improved optical performance throughout the entire area of the image frame, it is preferred to make at least one of the surfaces of the sixth lens an aspherical surface of such shape that as the radial distance from the optical axis increases, the negative refractive power decreases. By this, the tendency of the curvature of field to vary to under-correction particularly in the intermediate region of the zooming range can be lessened.

For note, in the present invention, focusing is preferably by moving the lens system as a whole because variation of aberrations is little. But, another focusing method of moving only either one of the front and rear lens units I and II may be employed with an advantage of simplifying the operating mechanism.

When the above-stated rules of design of the invention are satisfied, a zoom lens of very compact form of about 1.25 in telephoto ratio for the wide angle end (total length of the lens/focal length in the wide angle end) well corrected for the various aberration can be achieved.

Examples of specific zoom lens of the invention can be constructed in accordance with the numerical data given in the following tables for the radii of curvature, R, the axial thicknesses and air separations, D, and the refractive indices, N, and Abbe numbers, $\nu$, of the glasses of the lens elements with the subscripts numbered from front to rear.

Taking an X-axis in the axial direction, a Y-axis in a direction perpendicular to the optical axis, and the direction in which light advances as positive with the original point at the vertex, an equation for the aspherical surface may be expressed by $$X = \frac{(1/R)Y^2}{1 + \sqrt{1 - (Y/R)^2}} + a1 \cdot Y^2 + a2 \cdot Y^4 + a3 \cdot Y^6 + a4 \cdot Y^8 + a5 \cdot Y^{10} + |b1| \cdot Y^3 + |b2| \cdot y^5 + |b3| \cdot y^7 + |b4| \cdot y^9$$

where R is the radius of curvature of the paraxial region of the lens surface of the sixth lens, and a1, a2, a3, a4, a5, b 1, b2, b3 and b4 are aspherical coefficients.

Numerical Example 1
F = 100–200  FNO = 1:3.5–5.6  $2\omega$ = 63.4°–34.3°

| | | | |
|---|---|---|---|
| R1 = 45.13 | D1 = 7.43 | N1 = 1.60311 | $\nu$1 = 60.7 |
| R2 = 210.53 | D2 = 3.93 | | |
| R3 = −59.11 | D3 = 3.12 | N2 = 1.80610 | $\nu$2 = 40.9 |
| R4 = 40.14 | D4 = 7.97 | N3 = 1.70154 | $\nu$3 = 41.2 |
| R5 = 92.01 | D5 = 0.95 | | |
| R6 = 147.63 | D6 = 7.13 | N4 = 1.60311 | $\nu$4 = 60.7 |
| R7 = −49.47 | D7 = 0.43 | | |
| R8 = 616.09 | D8 = 5.53 | N5 = 1.60311 | $\nu$5 = 60.7 |
| R9 = −98.23 | D9 = Variable | | |
| R10 = −59.57 | D10 = 9.37 | N6 = 1.71700 | $\nu$6 = 47.9 |
| R11 = −41.47 | D11 = 11.89 | | |
| *R12 = −40.00 | D12 = 4.57 | N7 = 1.60311 | $\nu$7 = 60.7 |
| R13 = −229.68 | | | |

Aspherical Coefficients of the Surface R12 a1 = −3.507 × 10$^{-3}$   b1 = −2.953 × 10$^{-6}$
a2 = −2.834 × 10$^{-7}$   b2 = −3.852 × 10$^{-8}$
a3 = 6.186 × 10$^{-10}$   b3 = −5.282 × 10$^{-11}$
a4 = 2.261 × 10$^{-12}$   b4 = −2.447 × 10$^{-14}$
a5 = 2.813 × 10$^{-16}$

| | f | D8 |
|---|---|---|
| (1) $\phi$1 = 1.129 $\phi$W | 100 | 54.93 |
| (2) $\phi$2 = −1.003 $\phi$W | 150 | 25.49 |
| (3) eW = 0.772/$\phi$W | 200 | 10.78 |

(4) $\dfrac{N22 - N21}{R4} = -0.26\, \phi W$ (5) $\nu$22 − $\nu$21 = 0.3

Numerical Example 2
F = 100.00000–166.7  FNO = 1:4–5.6  $2\omega$ = 62°–39.7°

| | | | |
|---|---|---|---|
| R1 = 53.07 | D1 = 7.00 | N1 = 1.60311 | $\nu$1 = 60.7 |
| R2 = 126.68 | D2 = 10.74 | | |
| R3 = −56.27 | D3 = 2.93 | N2 = 1.80610 | $\nu$2 = 40.9 |
| R4 = 28.88 | D4 = 10.95 | N3 = 1.70154 | $\nu$3 = 41.2 |
| R5 = 74.15 | D5 = 0.27 | | |
| R6 = 65.88 | D6 = 11.99 | N4 = 1.60311 | $\nu$4 = 60.7 |
| R7 = −50.44 | D7 = 0.42 | | |
| R8 = 126.46 | D8 = 7.68 | N5 = 1.60311 | $\nu$5 = 60.7 |
| R9 = −155.94 | D9 = Variable | | |
| R10 = −49.26 | D10 = 5.17 | N6 = 1.71700 | $\nu$6 = 47.9 |
| R11 = −44.18 | D11 = 23.72 | | |
| R12 = −43.41 | D12 = 4.44 | N7 = 1.60311 | $\nu$7 = 60.7 |
| R13 = −602.45 | | | |

| | f | D9 |
|---|---|---|
| (1) $\phi$1 = 1.161 $\phi$W | 100 | 43.89 |
| (2) $\phi$2 = −1.031 $\phi$W | 130 | 24.62 |
| (3) eW = 0.726/$\phi$W | 166.7 | 10.48 |

(4) $\dfrac{N22 - N21}{R4} = -0.362\, \phi W$ (5) $\nu$22 − $\nu$21 = 0.3

Numerical Example 3
F = 100.00000–188.9  FNO = 1:4–5.6  $2\omega$ = 62°–35.3°

| | | | |
|---|---|---|---|
| R1 = 47.50 | D1 = 10.44 | N1 = 1.61800 | $\nu$1 = 63.4 |
| R2 = 112.77 | D2 = 3.53 | | |
| R3 = −63.77 | D3 = 5.37 | N2 = 1.80440 | $\nu$2 = 39.6 |
| R4 = 39.88 | D4 = 7.46 | N3 = 1.66755 | $\nu$3 = 41.9 |
| R5 = 216.70 | D5 = 0.73 | | |
| R6 = 284.61 | D6 = 8.56 | N4 = 1.61800 | $\nu$4 = 63.4 |
| R7 = −67.97 | D7 = 0.42 | | |
| R8 = 161.84 | D8 = 6.57 | N5 = 1.61800 | $\nu$5 = 63.4 |
| R9 = −94.24 | D9 = Variable | | |
| R10 = −52.36 | D10 = 6.17 | N6 = 1.75700 | $\nu$6 = 47.9 |
| R11 = −44.12 | D11 = 17.28 | | |
| R12 = −36.95 | D12 = 4.44 | N7 = 1.60311 | $\nu$7 = 60.7 |
| *R13 = 332.43 | | | |

Aspherical Coefficients of the Surface R13 a1 = −3.337 × 10$^{-3}$   b1 = 3.551 × 10$^{-7}$
a2 = −1.878 × 10$^{-7}$   b2 = 1.204 × 10$^{-8}$
a3 = −6.771 × 10$^{-11}$  b3 = 4.151 × 10$^{-12}$
a4 = −2.614 × 10$^{-13}$  b4 = −5.406 × 10$^{-15}$
a5 = 1.339 × 10$^{-16}$

| | f | D9 |
|---|---|---|
| (1) $\phi$1 = 1.161 $\phi$W | 100 | 47.66 |
| (2) $\phi$2 = −1.031 $\phi$W | 140 | 23.80 |
| (3) eW = 0.726/$\phi$W | 188.9 | 8.35 |

(4) $\dfrac{N22 - N21}{R4} = -0.343\, \phi W$ $$(5)\ \nu22 - \nu21 = 2.3$$

What is claimed is:

1. An objective lens comprising a front lens unit and a rear lens unit with a separation between said two lens unit being varied to vary the focal length of the entire system, said front lens unit having a positive refractive power and consisting of, from front to rear, a positive lens of strong convex curvature toward the front, a negative doublet lens of negative and positive elements cemented together, and a positive lens sub-unit; and said rear lens unit having a negative refractive power and having a positive lens and a negative lens.

2. An objective lens according to claim 1, wherein the negative element of said doublet lens is of bi-concave form, and the positive element is of meniscus form.

3. An objective lens according to claim 1, satisfying the following conditions:

$$-0.6\phi W < (N22-N21/R4) < -0.1\phi W$$

$$-10 < \nu22 - \nu21 < 10$$

where N21 and $\nu21$ are the refractive index and Abbe number of the negative element of said doublet lens, N22 and $\nu22$ are the refractive index and Abbe number of the positive element, R4 is the radius of curvature of the cemented surface of the negative and positive elements, and $\phi W$ is the refractive power of the entire system in the wide angle end.

4. An objective lens according to claim 1, wherein said positive lens sub-unit consists of two positive lenses.

5. An objective lens according to claim 4, wherein the front one of said two positive lenses is of bi-convex form.

6. An objective lens according to claim 1, wherein said rear lens unit comprises a positive meniscus lens of forward concavity and a negative meniscus lens of forward concavity arranged in this order from front.

7. An objective lens according to claim 6, wherein said rear lens unit has at least one aspherical surface.

8. An objective lens according to claim 1, wherein said front lens unit and said rear lens unit move forward while shortening the separation between said two units as the focal length increases.

9. A zoom lens comprising:

a front lens unit having a positive refractive power and consisting of, from front to rear, a positive lens with its front surface of strong convex curvature toward the front, a negative doublet lens of a bi-convex element and a positive meniscus element cemented together in this order from the front, and a plurality of positive lenses; and a rear lens unit arranged on the image side of said front lens unit, axially movable along with, and independently of said front lens unit, having a negative refractive power, and comprising a positive meniscus lens of forward concavity, and a negative meniscus lens of forward concavity.

10. A zoom lens according to claim 9, satisfying the following condition:

$$-0.6\phi W22 - N21/R4) < -0.1\phi W$$

$$-10 < \nu22 - \nu21 < 10$$

where N21 and $\nu21$ are the refractive index and Abbe number of the bi-concave element of said doublet lens, N22 and $\nu22$ are the refractive index and Abbe number of the positive meniscus element, R4 is the radius of curvature of the cemented surface of the negative and positive elements, and $\phi W$ is the refractive power of the entire system in the wide angle end.

* * * * *